United States Patent [19]
Ohashi et al.

[11] Patent Number: 5,748,182
[45] Date of Patent: May 5, 1998

[54] COORDINATES INPUT APPARATUS CONNECTED TO IMAGE PROCESSING SYSTEM

[75] Inventors: Masashi Ohashi; Shinnosuke Taniishi, both of Tokyo, Japan

[73] Assignee: Canon Kabushiki Kaisha, Tokyo, Japan

[21] Appl. No.: 305,818

[22] Filed: Sep. 14, 1994

Related U.S. Application Data

[63] Continuation of Ser. No. 924,797, Aug. 6, 1992, abandoned, which is a continuation of Ser. No. 581,144, Sep. 10, 1990, abandoned, which is a continuation of Ser. No. 180,450, Apr. 12, 1988, abandoned.

[30] Foreign Application Priority Data

Apr. 15, 1987 [JP] Japan ................... 62-90880

[51] Int. Cl.$^6$ ................................................. G09G 5/00
[52] U.S. Cl. ................... 345/173; 345/177; 399/185
[58] Field of Search .................... 345/156, 173, 345/177, 179, 174, 175, 176; 178/18, 19; 341/5; 355/271, 282, 308, 311, 313, 218, 234; 399/81, 185

[56] References Cited

U.S. PATENT DOCUMENTS

| | | | |
|---|---|---|---|
| 3,134,099 | 5/1964 | Woo | 174/18 |
| 3,653,031 | 3/1972 | Hlady et al. | 341/5 |
| 3,684,828 | 8/1972 | Maher | 178/18 |
| 3,808,364 | 4/1974 | Veith | 178/19 |
| 3,846,580 | 11/1974 | Brenner | 178/19 |
| 4,121,049 | 10/1978 | Roeber | 178/18 |
| 4,216,352 | 8/1980 | Chamuel | 178/19 |
| 4,393,268 | 7/1983 | Guedj et al. | 178/18 |
| 4,617,515 | 10/1986 | Taguchi et al. | 178/18 |
| 4,654,648 | 3/1987 | Herrington et al. | 340/710 |
| 4,697,244 | 9/1987 | Murakami et al. | 340/706 |
| 4,709,209 | 11/1987 | Murakami et al. | 178/18 |
| 4,782,328 | 11/1988 | Denlinger | 340/712 |
| 4,799,080 | 1/1989 | Fujiwara | 355/7 |
| 4,812,874 | 3/1989 | Kubota et al. | 355/7 |
| 4,870,458 | 9/1989 | Shibuya et al. | 340/712 |

*Primary Examiner*—Xiao Wu
*Attorney, Agent, or Firm*—Fitzpatrick, Cella, Harper & Scinto

[57] ABSTRACT

A coordinates input device connected to an image processing system such as a copying machine for reading an image recorded on a recording medium and for editing this image. This device includes: a transparent vibration propagating plate to designate an editing area for trimming or masking in contact relation with the recording medium from which the image was read by the image processing system; a vibration pen to input a supersonic vibration by coming into contact with the vibration propagating plate; vibration sensors which are attached to the plate and detect the vibration generated from the vibration pen; and a controller for supplying to the image processing system the editing area information for the recording medium designated by the coordinates of the vibration pen on the plate which were detected by the vibration sensors. The propagation times of the supersonic vibration which is propagated by the vibration propagating plate to the vibration sensors are measured and the coordinates of the position of the vibration pen are calculated on the basis of the measured vibration propagation times. With this apparatus, a desired editing area on an original image can be easily designated through the transparent input tablet and the editing information can be easily controlled.

10 Claims, 6 Drawing Sheets

1

COORDINATES INPUT APPARATUS CONNECTED TO IMAGE PROCESSING SYSTEM

This application is a continuation of application Ser. No. 07/924,797 filed Aug. 6, 1992, now abandoned, which is a continuation of Ser. No. 07/581,144 filed Sep. 10, 1990, now abandoned, which is a continuation of prior application Ser. No. 07/180,450 filed Apr. 12, 1988, now abandoned.

BACKGROUND OF THE INVENTION

1. Field of the Invention

The present invention relates to an image processing system and, more particularly, to a coordinates input apparatus which is connected to an image processing system for performing image processes such as reading, copying, and the like, on an original image.

2. Related Background Art

Hitherto, as an apparatus to input handwriting characters, figures, or the like to a processor such as a computer or the like, various kinds of coordinates input apparatuses using input pen, tablet, and the like are known.

In such apparatuses, image information consisting of input characters, figures, and the like are output to a display device such as a CRT display or a recording device such as a printer. There is also known an apparatus in which not only information such as characters, figures, or the like but also input coordinates information are used for image processes.

For example, in a copying apparatus, image reading apparatus, or the like, it is known that image control such as trimming or masking of an image to select a copying or reading area is performed on the basis of the coordinates information which is input by using the foregoing input apparatus.

The following various kinds of methods are known as methods of detecting the coordinates of an input tablet and are used in the above application fields.

1) A method whereby a change in resistance value of a sheet material arranged so as to face a resistive film is detected.

2) A method whereby an electromagnetic or electrostatic induction of a conductive sheet or the like arranged so as to face the film is detected.

3) A method whereby a supersonic vibration which is propagated from an input pen to a tablet is detected.

According to the methods 1) and 2), since a resistive film or conductive film is used, it is difficult to form a transparent tablet. Therefore, these methods are improper for use with the image processes mentioned above.

For example, in the case of using an opaque tablet, an original is put thereon and the coordinates of a trimming or masking range are input. However, according to this method, in the case of an original of a book which is thickly bound or the like, it is quite impossible to input coordinates.

On the other hand, according to the method 3), since the tablet can be made of a transparent material such as acrylic plate, glass plate, or the like, it is considered that the tablet can be used by overlaying on an original irrespective of a thickness of original. On the other hand, since the structure of the apparatus is simpler than those of the other methods, the apparatus can be cheaply constituted.

SUMMARY OF THE INVENTION

It is the first object of the present invention to provide a coordinates input apparatus comprising: a vibration propagating plate which is put on an original and is made of a transparent member which is separately provided from a main unit of an image processing section; a vibration pen to input a vibration to the vibration propagating plate; a plurality of sensors attached to the vibration propagating plate in order to detect the vibration which is input by the vibration pen; and means for supplying editing information to an image processing system on the basis of the coordinates information on the vibration propagating plate which are detected by the sensors.

The second object of the invention is to provide a coordinates input apparatus in which an input tablet made of a transparent vibration propagating plate is overlaid on an original and coordinates are input, and image processing conditions can be controlled on the basis of the input coordinates.

DETAILED DESCRIPTION OF THE PREFERRED EMBODIMENT

Figure 1A:
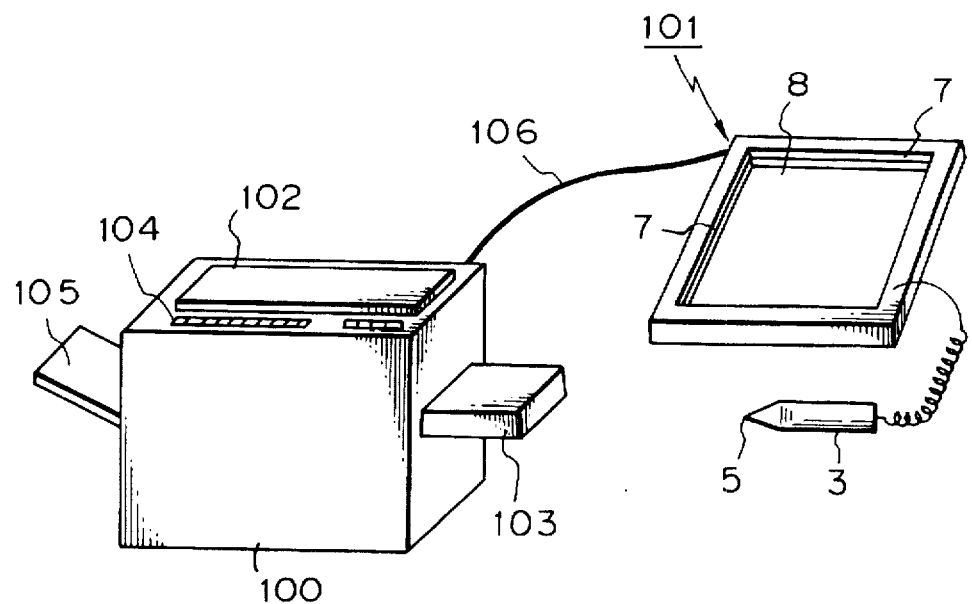
FIG. 1(A) is an explanatory diagram showing an arrangement of an image processing system to which the present invention is applied.

The present invention will be described in detail hereinbelow on the basis of an embodiment shown in the drawings.

FIG. 1(A) shows a copying apparatus 100 as an embodiment of an image processing system to which the invention is applied.

The copying apparatus 100 shown in the diagram has substantially the same structure as that in the conventional apparatus. Namely, on the basis of operation inputs of an operating section 104, the image read by an original reading section 102 is copied to a copy paper enclosed in a copy paper cassette 103 by an electrophotographic system or the like and the copied paper is discharged onto a tray 105.

The copying apparatus 100 has an input tablet 101 connected to the main unit by a cable 106 and can perform an editing process such as trimming or masking to copy only a part of an original image on the basis of coordinates information which is input by the input tablet 101.

The input tablet 101 has a vibration propagating plate 8 made of a transparent acrylic plate, glass plate, or the like in its central portion. By inputting a vibration to the plate 8 by using a vibration pen 3, the coordinates information of the vibration pen 3 can be detected.

The input tablet 101 is used in the following manner.

First, an original to be copied is put on the reading section 102 or the like. The input tablet 101 is put onto the copying surface of the original (the other input methods will be explained hereinafter).

A predetermined corner portion of the vibration propagating plate 8 of the input tablet 101 is set to a predetermined position such as a corner or the like of the original. An area is designated by an editing process such as trimming or masking using the vibration pen 3 while looking at the copying surface of the original through the plate 8. As a method of designating the editing area, various kinds of methods are considered such as a method whereby four corners of the editing area are designated by the vibration pen 3, a method whereby a diagonal line portion of the rectangular editing area is designated by the vibration pen 3, and the like.

A horn portion 5 to input a vibration is attached to the tip of the vibration pen 3. When the horn portion 5 is brought into contact with the vibration propagating plate 8, the vibration propagated on the plate 8 is detected by a plurality of vibration sensors attached to the edge portion of the plate 8. The vibration detection timings of the vibration sensors are delayed in dependence on the distance between each sensor and the vibration input point. Therefore, by detecting the delay times, the position of the vibration pen 3 on the vibration propagating plate 8, namely, the coordinates information can be detected.

The detected coordinates information are input to an image processing and control section in the main unit of the copying apparatus 100 through the cable 106 and used to designate an editing area for trimming or masking. Therefore, by using the original matching position to the plate 8 as a reference, the coordinates system on the plate 8 is made to correspond to the coordinates system using the original matching position of the original reading section 102 as a reference.

Since the image editing process such as trimming or masking is well known in the copying apparatus, its detailed description is omitted.

A structure of the input tablet 101 and the process to input coordinates will now be explained in detail.

Figure 1B:
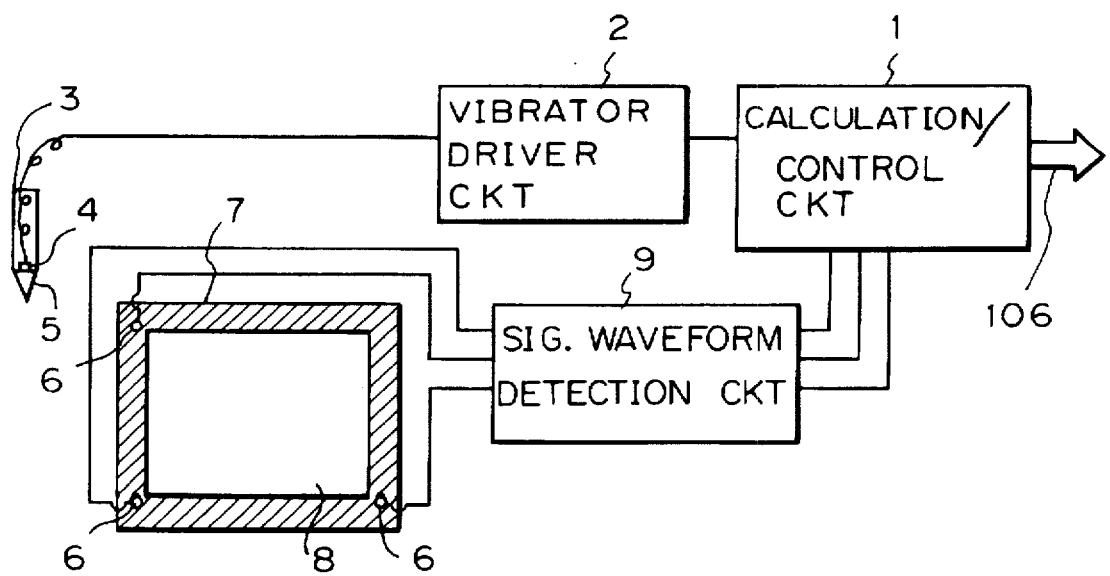
FIG. 1(B) is an explanatory diagram showing a constitution of an input tablet in FIG. 1(A)

FIG. 1(B) shows structures of the vibration pen 3 and vibration propagating plate 8 of the input tablet 101 and an arrangement of a coordinates detecting system.

In FIG. 1(B), the vibration propagating plate 8 is made of acrylic plate, glass plate, or the like and propagates the vibration input by the vibration pen 3 to three vibration sensors 6 attached to three corner portions of the plate 8. In this embodiment, by measuring the propagation times of the supersonic vibration propagated from the vibration pen 3 to the vibration sensors 6 through the plate 8, the coordinates of the pen 3 on the plate 8 are detected.

To prevent the vibration propagated from the vibration pen 3 from being reflected by the peripheral portions and returned toward the central portion, the peripheral portion of the plate 8 is supported by a reflection preventing material 7 made of silicon rubber or the like covered by a frame portion made of plastics or the like.

The vibration pen 3 used to propagate the supersonic vibration to the plate 8 has therein a vibrator 4 comprising of a piezoelectric device or the like. The supersonic vibration generated from the vibrator 4 is transferred to the plate 8 through the horn portion 5 having a pointed tip.

Figure 2:
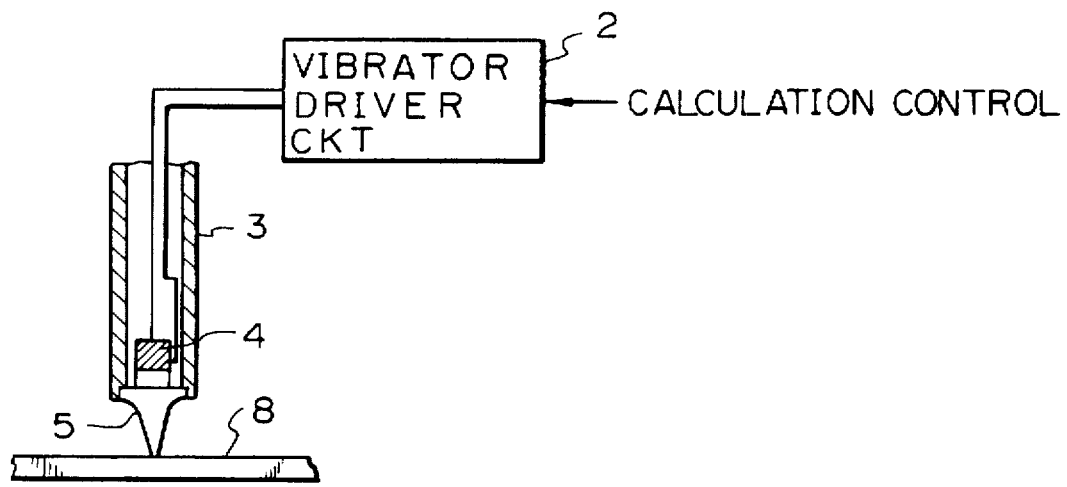
FIG. 2 is an explanatory diagram showing a structure of a vibration pen in FIG. 1.

FIG. 2 shows a structure of the vibration pen 3. The vibrator 4 assembled in the vibration pen 3 is driven by a vibrator driver circuit 2. A drive signal of the vibrator 4 is supplied as a pulse signal of a low level from a calculation/control circuit 1 in FIG. 1. The drive signal is amplified by a predetermined gain by the vibrator driver circuit 2 which can be driven at a low impedance. Thereafter, the amplified drive signal is applied to the vibrator 4.

The electric drive signal is converted into the mechanical supersonic vibration by the vibrator 4 and transferred to the plate 8 through the horn portion 5.

A vibrating frequency of the vibrator 4 is selected to cause the vibration propagating plate 8 made of acrylic plate, glass plate, or the like to generate plate waves. On the other hand, when the vibrator is driven, a vibrating mode such as to allow the vibrator 4 to vibrate mainly in the vertical direction in FIG. 2 for the vibration propagating plate 8 is selected. By setting a vibrating frequency of the vibrator 4 to the resonant frequency of the vibrator 4, the vibration can be efficiently converted.

The elastic waves which are transferred to the plate 8 in this manner are the plate waves and have an advantage such that they are hardly influenced by scratches on the surface of the plate 8, obstacles, or the like as compared with surface waves or the like.

Returning to FIG. 1(B), the vibration sensors 6 attached to the corner portions of the plate 8 also comprise mechanical/electrical converting devices such as piezoelectric devices or the like. Output signals of the three vibration sensors 6 are input to a signal waveform detection circuit 9 and converted into detection signals by the calculation/control circuit 1 at the post stage so that they can be processed. The calculation/control circuit 1 measures the vibration propagation times, thereby detecting the coordinates of the position of the vibration pen 3 on the plate 8.

The detected coordinates information corresponding to the position of the vibration pen 3 are input to the image processing and control section of the copying apparatus 100 through the cable 106 and used for the editing processes.

Figure 3:
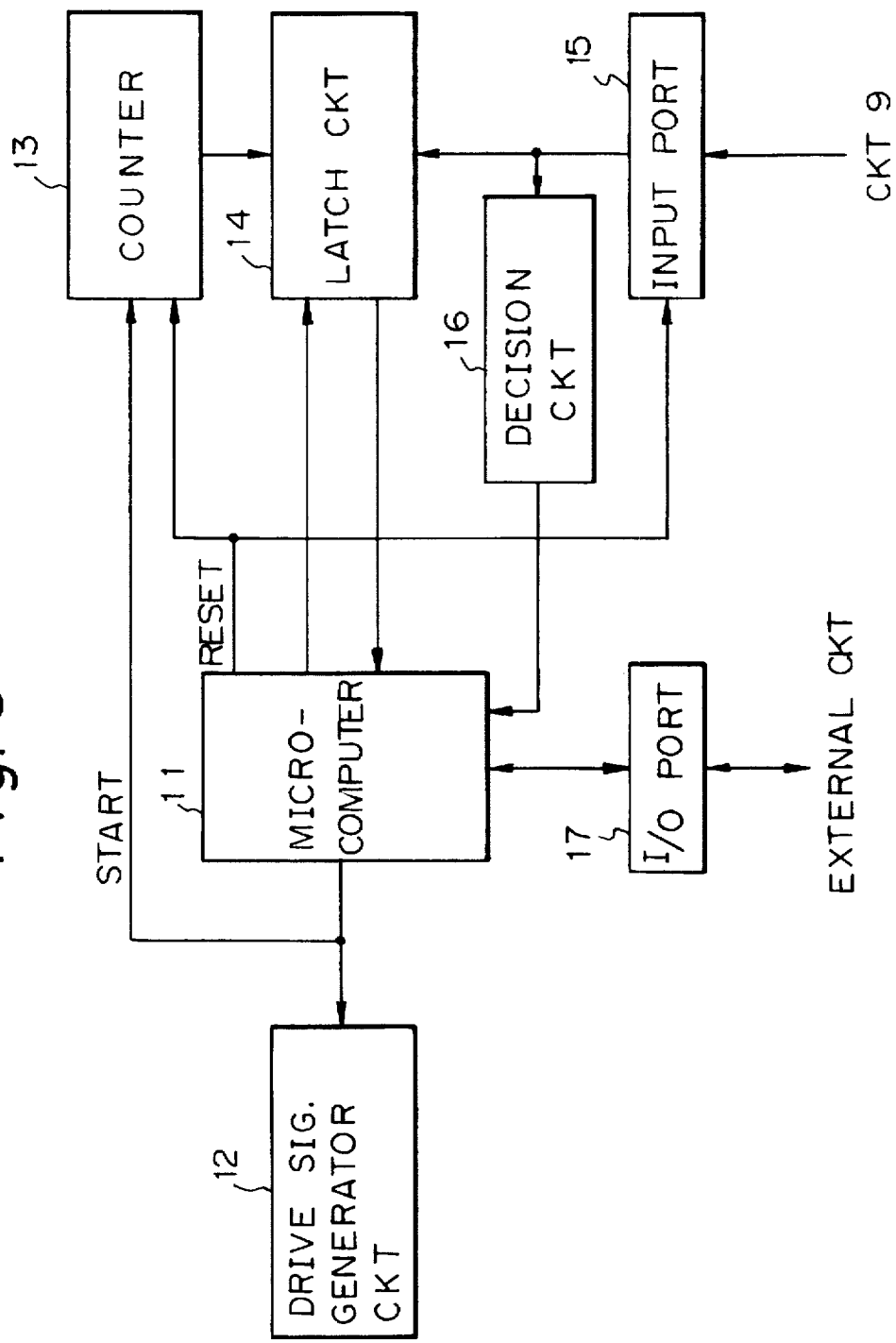
FIG. 3 is a block diagram showing an arrangement of a calculation/control circuit in FIG. 1.

FIG. 3 shows a constitution of the calculation/control circuit 1 in FIG. 1. This diagram mainly shows structures of the driving system of the vibration pen 3 and of the vibration detecting system used by the vibration sensors 6.

A microcomputer 11 has therein an internal counter, a ROM, and a RAM. A drive signal generator 12 outputs drive pulses of a predetermined frequency to the vibrator driver circuit 2 in FIG. 1 and is made operative by the microcomputer 11 synchronously with the circuit to calculate the coordinates.

A count value of a counter 13 is latched into a latch circuit 14 by the microcomputer 11.

On the other hand, from the outputs of the vibration sensors 6, the waveform detection circuit 9 outputs timing information of a detection signal to measure the vibration propagation times for detection of the coordinates and signal level information for detection of a writing pressure as will be explained hereinafter. The timing and level information are input to an input port 15 and an decision circuit 16, respectively.

The timing signal which is input from the waveform detection circuit 9 is supplied to the input port 15 and compared with a count value in the latch circuit 14 by the decision circuit 16. The result is transferred to the microcomputer 11. That is, the vibration propagation time is expressed as a latch value of output data of the counter 13. The coordinates are calculated by the value of the vibration propagating time. The output of the calculation/control circuit 1 is provided to cable 106 through I/O port 17.

Figure 4:
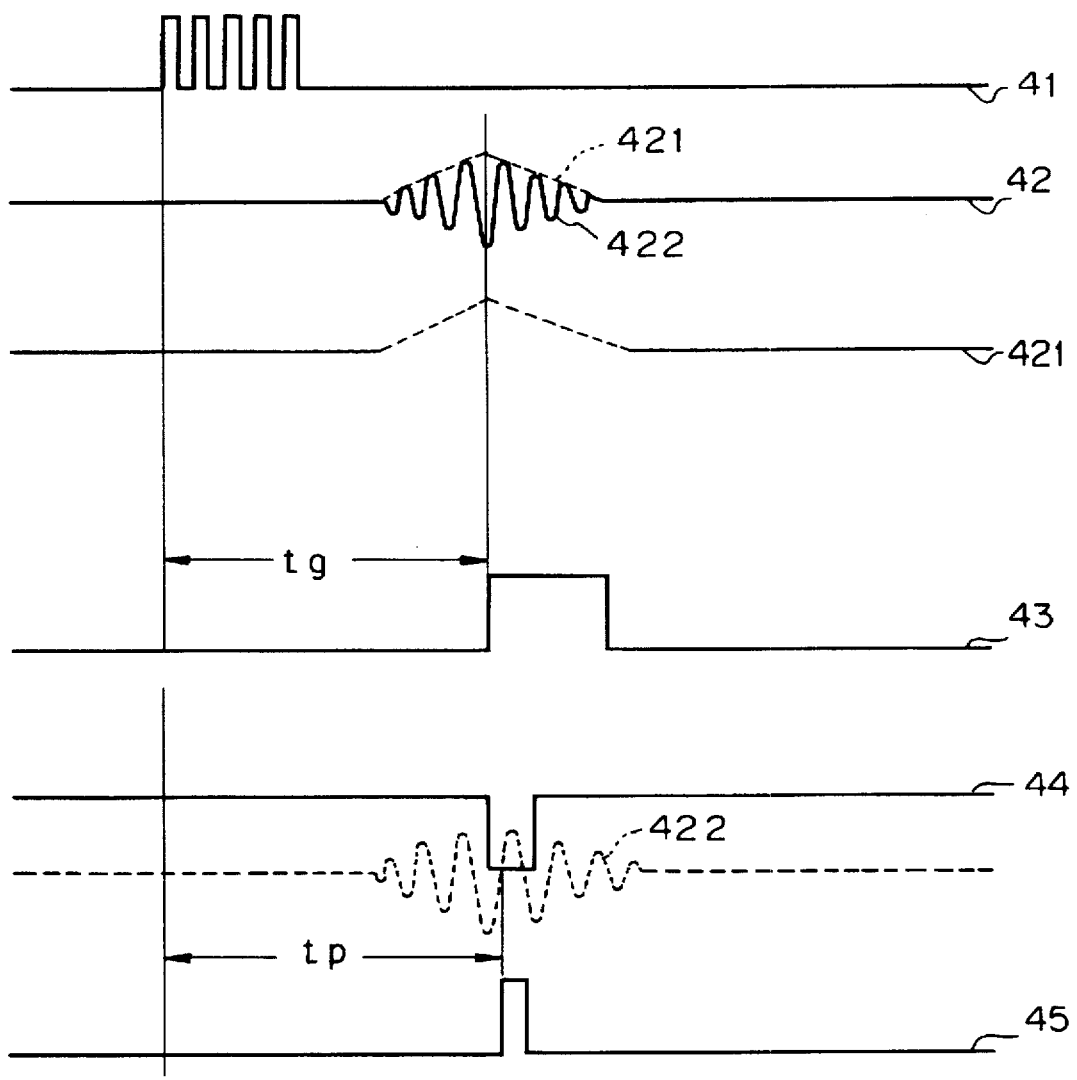
FIG. 4 is a waveform diagram showing detection waveforms for explaining the measurement of distances among the vibration pen and vibration sensors.

FIG. 4 is a diagram showing detection waveforms which are input to the waveform detection circuit 9 in FIG. 1 and explains the processes used to measure the vibration propagation times based on the detection waveforms. In FIG. 4, drive signal pulses 41 are applied to the vibration pen 3. The supersonic vibration transferred to the vibration propagating plate 8 from the vibration pen 3 which had been driven by such waveforms is propagated in the plate 8 and detected by the vibration sensor 6.

After the vibration propagates in the plate 8 to the vibration sensor 6 for a period of time $t_g$ according to the distance to the vibration sensor 6, the vibration reaches the vibration sensor 6. In FIG. 4, reference numeral 42 denotes a signal waveform detected by the vibration sensor 6. In this embodiment, the dispersive plate waves are used. Therefore, the relation between an envelope 421 and a phase 422 of the detected waveform to the propagation distance in the plate 8 changes during the propagation of the vibration in accordance with the propagation distance.

It is now assumed that a group velocity of the envelope is $V_g$ and a phase velocity is $V_p$. The distance between the vibration pen 3 and the vibration sensor 6 can be detected from the difference between the group velocity and the phase velocity.

First, when attention is paid to only the envelope 421, the velocity is $V_g$. When a special point on the waveform, e.g., the peak is detected as shown at 43 in FIG. 4, a distance d between the vibration pen 3 and the vibration sensor 6 can be obtained by $$d = V_g \cdot t_g \quad (1)$$

assuming that the vibration propagation time is $t_g$. Although this equation relates to one of the vibration sensors 6, the distance between each of the other two vibration sensors 6 and the vibration pen 3 can also be derived by the same equation.

Further, to determine the coordinate values more accurately, the processes are executed on the basis of the detection of the phase signal. When it is assumed that a period of time from a special detection point of the phase waveform 422 in FIG. 4, e.g., from the time point when the vibration was applied to the zero cross point after passing through the peak is set to $t_p$, the distance d between the vibration sensor and the vibration pen is calculated by $$d = n \cdot \lambda_p + V_p \cdot t_p \quad (2)$$

where, $\lambda_p$ denotes a wavelength of the elastic wave and n is an integer. As shown in FIG. 4, when pulse 43 is generated, a pulse 44 is generated together therewith. Within pulse 44, pulse 45 is generated at the zero cross point and identifies the time period $t_p$.

From the equations (1) and (2), the integer n is obtained by $$n = [(V_g \cdot t_g - V_p \cdot t_p)/\lambda_p + 1/N] \quad (3)$$

N denotes a real number other than 0 and a proper numerical value is used. For example, when N=2, in the case of a wavelength within a range of ±½, n can be determined. In this manner, n can be decided.

By substituting the calculated value of n in the equation (2), the distance between the vibration pen 3 and the vibration sensor 6 can be accurately measured.

Figure 5:
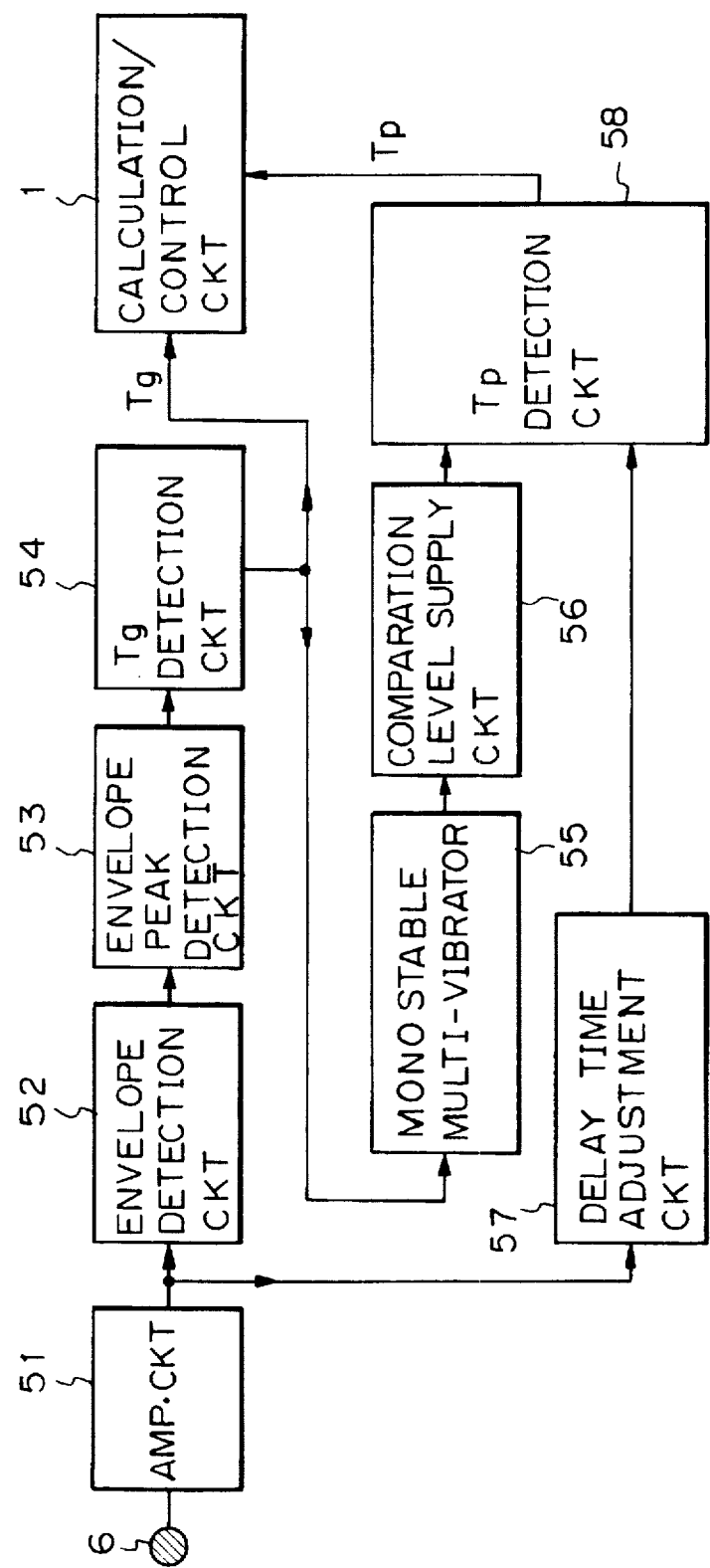
FIG. 5 is a block diagram showing an arrangement of a waveform detection circuit in FIG. 1.

The two vibration propagation times $t_g$ and $t_p$ shown in FIG. 4 are measured by the waveform detection circuit 9 in FIG. 1(B). The waveform detection circuit 9 is constituted as shown in FIG. 5. The waveform detection circuit in FIG. 5 also processes the level information of the output waveforms of the vibration sensors 6 as will be explained hereinlater in order to detect the writing pressure.

In FIG. 5, the output signal of the vibration sensor 6 is amplified to a predetermined level by an amplifier circuit 51. The amplified signal is input to an envelope detection circuit 52 and only the envelope of the detection signal is taken out. The timing of the peak of the extracted envelope is detected by an envelope peak detection circuit 53. The peak detection signal is input to a signal detection circuit 54 comprising a monostable multi-vibrator or the like. An envelope delay time detection signal $T_g$ of a predetermined waveform is formed by the signal detection circuit 54 and input to the calculation/control circuit 1.

The original signal delayed by a delay time adjustment circuit 57 and the $T_g$ signal passed through monostable multi-vibrator circuit 55 and comparation level supply circuit 56 are input to a detection circuit 58 and compared. Thus, a phase delay time detection signal $T_p$ is formed by the detection circuit 58 and input to the calculation/control circuit 1.

The foregoing circuit relates to one vibration sensor 6. The same circuit is also provided for each of the other sensors 6. Assuming that the number of sensors is generally set to h, h detection signals of envelope delay times $T_{g1}$ to $T_{gh}$ and h detection signals of phase delay times $T_{p1}$ to $T_{ph}$ are input to the calculation/control circuit 1.

In the calculation/control circuit in FIG. 3, the signals $T_{g1}$ to $T_{gh}$ and $T_{p1}$ to $T_{ph}$ are input through the input port 15. The count value of the counter 13 is latched into the latch circuit 14 by using the timing of each signal as a trigger. Since the counter 13 is made operative synchronously with the actuation of the vibration pen, the data indicative of the delay time of each of the envelopes and phases are taken into the latch circuit 14.

Figure 6:
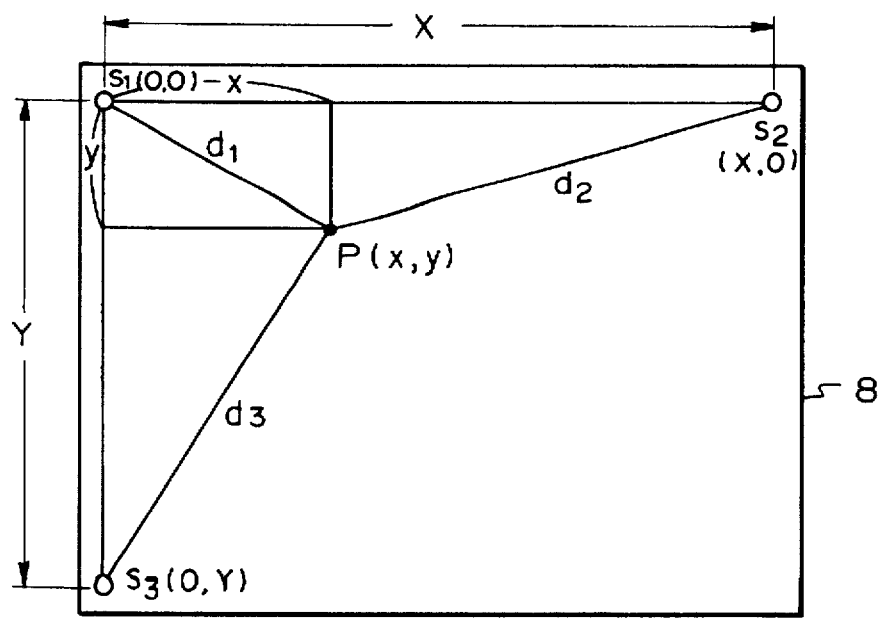
FIG. 6 is an explanatory diagram showing an arrangement of the vibration sensors.

As shown in FIG. 6, when the three vibration sensors 6 are arranged at the corner positions $S_1$ to $S_3$ on the vibration propagating plate 8, straight line distances $d_1$ to $d_3$ from a position P of the vibration pen 3 to the positions of the vibration sensors 6 can be calculated by the processes which have already been described in conjunction with FIG. 4. Further, the coordinates (x, y) of the position P of the vibration pen 3 can be obtained by the calculation/control circuit 1 on the basis of the distances $d_1$ to $d_3$ from the theorem of three squares by the following equations.

$$x = X/2 + (d_1 + d_2)(d_1 - d_2)/2X \quad (4)$$

$$y = Y/2 + (d_1 + d_3)(d_1 - d_3)/2Y \quad (5)$$

X and Y denote distances among the vibration sensors 6 at the positions $S_2$ and $S_3$ and the sensor at the origin (the position $S_1$) along the X and Y axes.

The position and coordinates of the vibration pen 3 can be detected in a real time manner as mentioned above.

The coordinates information input from the input tablet 101 as explained above are used as the designating information of an editing area for trimming or masking in the copying apparatus 100.

The operation to designate an editing area of the input tablet 101 will now be described in detail with reference to FIGS. 7 and 8.

Since the coordinates input section of the input tablet 101 is constituted by the transparent vibration propagating plate 8 as mentioned above, it is very suitable to designate a coordinates area on an original by an actual size.

Figure 7:
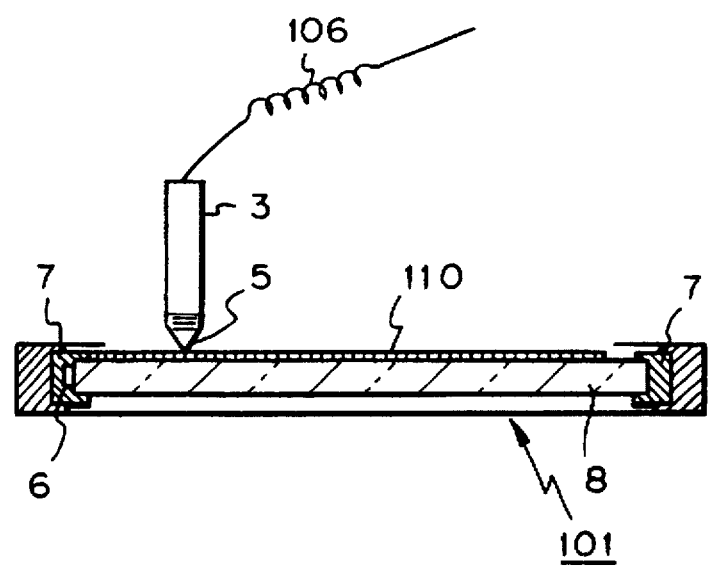
FIGS. 7 and 8 are explanatory diagrams showing different operating states of the input tablet.

For instance, in the case of a sheet-like original 110, as shown in FIG. 7, the original 110 is put on the vibration propagating plate 8 of the input tablet 101 and coordinates can be input through the original 110 by the vibration pen 3. As mentioned above, since the plate waves are used as the vibrating mode of the plate 8, even if the vibration is input through the original 110, enough vibration detecting strength can be obtained by the vibration sensor 6 and the coordinates can be accurately input.

Figure 8:
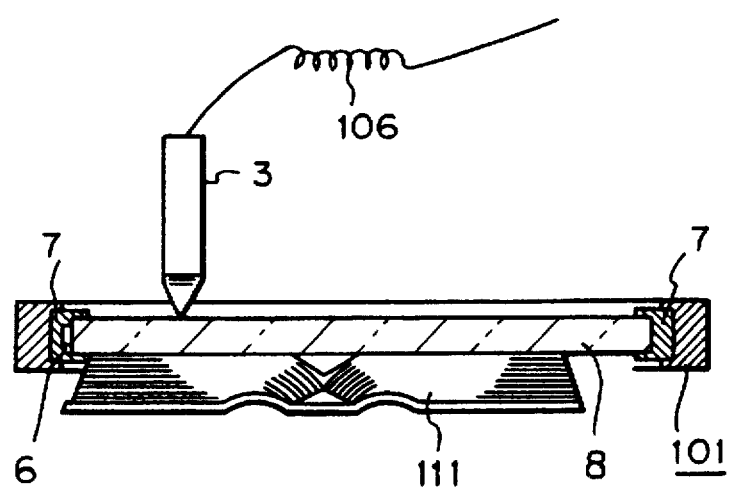

On the other hand, in the case of a thick original 111 like a book or the like, as shown in FIG. 8, the plate 8 of the input tablet 101 is put on a copying page of original 111 and an editing area can be designated by the vibration pen 3 while confirming the copying surface of the original 111 through the plate 8.

As explained above, according to the embodiment, since the vibration propagating plate 8 is made of a transparent material, by setting an original on both the front side and back side of the plate 8 depending on the kind of original, an editing area can be designated. Thus, excellent operability can be obtained. On the other hand, since the input tablet 101 is provided separately from the main unit of the copying apparatus, there is an excellent advantage such that an editing area can be easily designated even in the case of a thick original such as a book or the like.

The example of the process to designate an editing area in a copying apparatus has been shown and described above. However, it is obvious that a similar editing process can be also performed in other image processing systems, for example, in an image reading system or the like.

On the other hand, the vibration propagating plate 8 can be used as a substitute for a keyboard or the like by not only inputting coordinates but also printing a pattern for key switches onto the plate 8 and displaying and inputting coordinates to the display area. For example, the above constitution can be used as a switch to change over the editing process for masking, trimming, or the like. On the other hand, a display such as an LCD or the like may be attached under the vibration propagating plate 8 and the foregoing switch indications may be changed as necessary, thereby enabling the plate 8 to be used as a keyboard having many inputting functions. With this constitution, the operating section 104 of the copying apparatus 100 in FIG. 1(A) can be omitted and it is also possible to provide a system wherein all of the operations can be input from the vibration propagating plate 8 of the input tablet 101.

As will be obvious from the above description, according to the invention, in a coordinates input apparatus connected to an image processing system for performing image processes such as reading, copying, or the like on an original image, this apparatus comprises: a transparent vibration propagating plate which is put on an original and is provided separately from a main unit of an image processing section; a vibration pen to input a vibration to the vibration propagating plate; a plurality of sensors attached to the vibration propagating plate for detecting the vibration input from the vibration pen; and control means for supplying editing information to the main unit of an image processing system on the basis of the coordinates information of the vibration pen on the vibration propagating plate detected through the sensors. Therefore, the coordinates input apparatus consisting of the transparent vibration propagating plate is overlaid on the original or the original is put on the vibration propagating plate, and coordinates are input in this state and the image processing conditions can be controlled on the basis of the input coordinates. It is possible to provide a coordinates input apparatus having excellent operability which can easily control the editing information in various kinds of image processing system main units.

We claim:

1. A coordinate input apparatus adapted to be connected to an image processing system which has a reader for reading an image recorded on a recording medium, and which edits the read image and outputs editing area information corresponding to the editing, said coordinate input apparatus comprising:

a coordinate input member, located above the reader, for enabling coordinate input for a document placed under said coordinate input member and for a document placed above said coordinate input member;

single platewave detecting means, in contact with said coordinate input member, for detecting a propagated platewave generated from a platewave generating means into said coordinate input means directly or via the recording medium;

display means, united with said coordinate input member, for displaying information of the recording medium; and control means for supplying to the image processing system editing instruction information regarding the information displayed by said display means corresponding to coordinates on said coordinate input member whereby designation of the editing instruction information can be executed for a document placed on any one of both faces of said coordinate input member.

2. An apparatus according to claim 1, wherein said coordinate input member comprises detecting means for detecting supersonic waves.

3. An apparatus according to claim 2, further comprising microprocessor means for producing coordinate information in response to the supersonic waves detected by said detecting means.

4. An apparatus according to claim 3, wherein said microprocessor means computes the coordinate information in response to propagation time of the supersonic waves.

5. An apparatus according to claim 1, wherein said coordinate input member comprises microprocessor means for producing coordinate information.

6. An apparatus according to claim 1, wherein said coordinate input member comprises a transparent acrylic plate.

7. An apparatus according to claim 1, wherein said coordinate input member comprises a transparent glass plate.

8. An apparatus according to claim 1, wherein the editing comprises trimming.

9. An apparatus according to claim 1, wherein the editing comprises masking.

10. An apparatus according to claim 1, wherein said single platewave detecting means also detects a writing pressure.

* * * * *